United States Patent
Suzuki et al.

(10) Patent No.: US 6,439,030 B2
(45) Date of Patent: Aug. 27, 2002

(54) SIGNAL PROCESSING DEVICE FOR PIEZOELECTRIC SENSOR

(75) Inventors: Toshiyuki Suzuki, Handa; Eiichi Kurokawa, Okazaki; Hiroyuki Murai, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/873,452

(22) Filed: Jun. 5, 2001

(30) Foreign Application Priority Data

Jun. 9, 2000 (JP) ........................................ 2000-173271
Apr. 20, 2001 (JP) ........................................ 2001-123036

(51) Int. Cl.⁷ ............................................. G01L 23/22
(52) U.S. Cl. ...................................................... 73/35.13
(58) Field of Search ............................ 123/435, 406.22; 73/117.3, 35.11, 35.13

(56) References Cited

U.S. PATENT DOCUMENTS

| 3,701,903 | A | | 10/1972 | Merhar | |
|---|---|---|---|---|---|
| 4,345,558 | A | * | 8/1982 | Yamaguchi et al. | 123/435 |
| 4,424,705 | A | * | 1/1984 | Hattori et al. | 73/35.11 |
| 4,483,181 | A | * | 11/1984 | Maekawa et al | 73/35.11 |
| 4,491,010 | A | | 1/1985 | Brandt et al. | |
| 4,962,738 | A | | 10/1990 | Iwata | |
| 5,329,809 | A | * | 7/1994 | Sellnau et al. | 73/35.13 |
| 5,351,528 | A | | 10/1994 | Fukui et al. | |
| 5,535,722 | A | * | 7/1996 | Graessley et al. | 123/435 |
| 6,138,654 | A | * | 10/2000 | Pretorius et al. | 73/35.13 |

FOREIGN PATENT DOCUMENTS

| DE | 4115672 A1 | 11/1992 |
|---|---|---|
| JP | 58-011824 | 1/1983 |
| JP | 61-159126 | 7/1986 |
| JP | 63-11128 | 1/1988 |
| JP | 01-214728 | 8/1989 |
| JP | 2-91471 | 3/1990 |
| JP | 4-97614 | 3/1992 |
| JP | 4-101051 | 4/1992 |
| JP | 6-58337 | 8/1994 |
| JP | 07-106928 | 4/1995 |
| JP | 07-139736 | 5/1995 |
| JP | 7-218285 | 8/1995 |

* cited by examiner

*Primary Examiner*—Erick Solis
(74) *Attorney, Agent, or Firm*—Nixon & Vanderhye P.C.

(57) ABSTRACT

A signal processing device is provided which is designed to process an output of a piezoelectric sensor to produce a signal which indicates a load applied to the piezoelectric sensor accurately without being affected adversely by leakage current occurring in the piezoelectric sensor and electrical disturbances. The signal processing device includes a differentiating circuit which differentiates the output of the piezoelectric sensor and an integrating circuit which integrates an output of the differentiating circuit to produce an output signal as a function of the output of the piezoelectric sensor. The frequency range of the output signal is selected based on a frequency range of the load applied to the piezoelectric sensor.

11 Claims, 7 Drawing Sheets

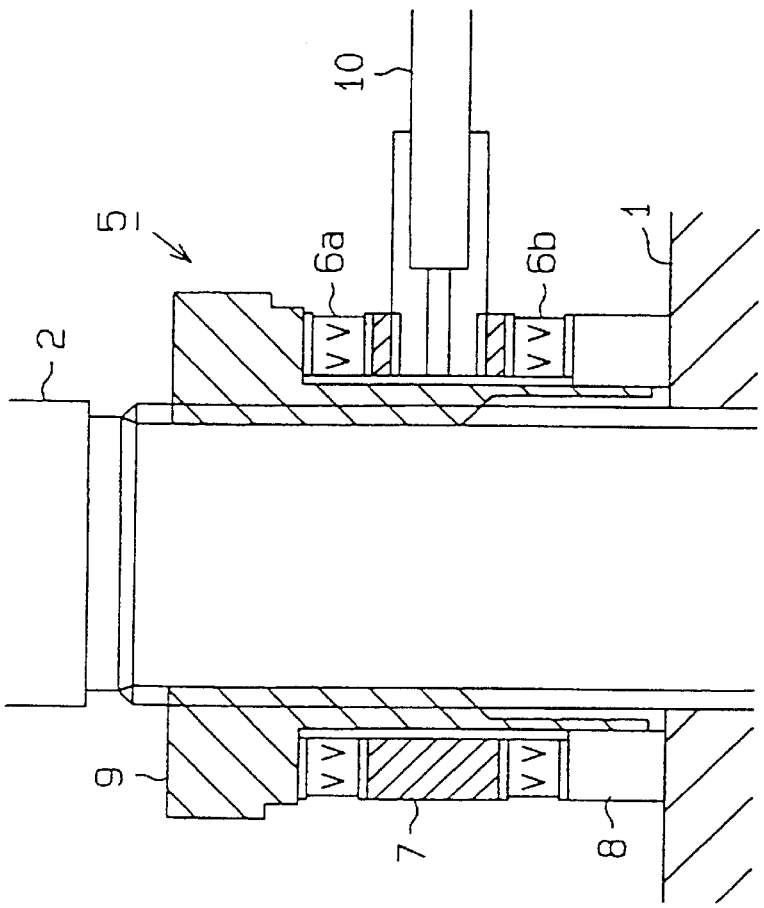
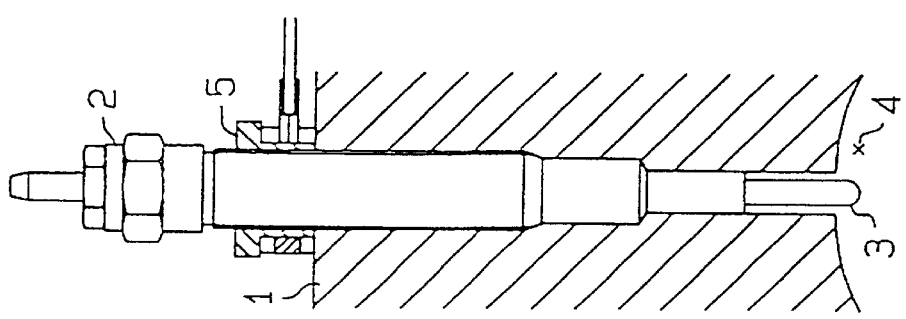
FIG. 1(b)
FIG. 1(a)

SIGNAL PROCESSING DEVICE FOR PIEZOELECTRIC SENSOR

BACKGROUND OF THE INVENTION

1. Technical Field of the Invention

The present invention relates generally to a signal processing device for use in a physical force measuring system which is designed to measure an applied physical force such as pressure or vibration using a piezoelectric device which may be employed in combustion pressure measuring device for measuring the combustion pressure of an internal combustion engine.

2. Background Art

Typical combustion pressure measuring devices for internal combustion engines use a charge amplifier designed as a signal processing circuit which handles an output of a combustion pressure sensor. The charge amplifier works to monitor a current outputted by a combustion pressure sensor in response to an applied pressure and integrate it to produce a voltage signal indicative of the combustion pressure. An example of a combustion pressure measuring device of this type is shown in FIG. 11.

A combustion pressure sensor 61 is coupled to an integrating circuit 62 made by a charge amplifier. An output of the integrating circuit 62 is transmitted to an external device through a high-pass filter 63, an amplifier 64, and a low-pass filter 65. The integrating circuit 62 is made up of an operational amplifier 66, a resistor 67, and a capacitor 68 and designed to integrate a charge produced in the combustion pressure sensor 61 to provide a voltage signal.

Specifically, the integrating circuit 62 integrates a weak current signal. Therefore, in order to prevent the capacitor 68 from being charged by a bias current from the operational amplifier 66, the operational amplifier 66 having a high input impedance is used to store the charges in the capacitor 68. The time constant of the integration depends upon the capacitor 68 and the resistor 67. The cut-off frequency of the integrating circuit 62 is relatively low, so that the resistance value of the resistor 67 will be several M $\Omega$ to several tens M $\Omega$. For instance, when the cut-off frequency of the integrating circuit 62 is 0.8 Hz, and the capacitance of the capacitor 68 is 0.1 $\mu$F, the resistance value of the resistor 67 will be approximately 2M $\Omega$.

The resistance value of the resistor 67 may be determined, as discussed below, in terms of a combustion cycle of the engine. The combustion cycle f of the engine using an engine speed during idling is $$f = 750 \text{ rpm}/(60 \text{ sec.} \times 2 \text{ cycles}) = 6.25 \text{ Hz}$$

Considering the fact that ensuring the integrating operation requires the cut-off frequency of the integrating circuit 62 to be one-tenth ($\frac{1}{10}$) of a frequency of a detected signal (i.e., the combustion cycle f), the resistance value Rin of the resistor 67 may be expressed by $$Rin \geq 1/(2\pi \times 0.1 \times f \times Cin)$$

where Cin is 0.1 $\mu$F. The resistance value Rin of the resistor 67 is, thus, 2.5M $\Omega$.

The input impedance of the integrating circuit 62 is equal to that of the resistor 67 and thus has a higher value. The integrating circuit 62 is, therefore, undermined easily by the leakage current from the combustion pressure sensor 61 or an external device due to the humidity. This problem will be described in detail below with reference to time charts in FIGS. 12(a) to 12(d).

Usually, the combustion pressure of the engine, as shown in FIG. 12(a), rises every combustion in each cylinder. In the absence of the leakage current, the output of the integrating circuit 62 changes, as shown in FIG. 12(b), within a voltage range (e.g., 0 to 12V) defined near the voltage of a power supply of the operational amplifier 66. Specifically, the output of the integrating circuit 62 changes following each change in level of the combustion pressure. Since the output of the combustion pressure sensor 61 is inputted to an inverting input (-) of the operational amplifier 66, the output of the integrating circuit 62 is reverse in level to the input thereinto. The operational amplifier 66 needs to be actuated on ±12V. Specifically, a negative (-) power supply voltage must be prepared, therefore, this system is unsuitable for automotive vehicles.

In the presence of the leakage current, the output of the integrating circuit 62 is, as shown in FIG. 12(c), shifted in level to a negative side. This will result in an unwanted change in output of the combustion pressure measuring device even though a dc component is removed by the high-pass filter 63.

If the leakage current increases greatly, it will cause the waveform of the output of the integrating circuit 62, as shown in FIG. 12(d), to be deformed greatly, so that the output indicative of the combustion pressure will be saturated at a minimum output voltage VL of the operational amplifier 66 (i.e., the voltage of the negative power supplied to the operational amplifier 66). Specifically, a great leakage current causes an error in the output of the combustion pressure measuring device to be produced.

Further, if electric noises arise in a driver for fuel injectors of the engine, it will cause the output of the integrating circuit 62 to change, thus resulting in decreased accuracy of measuring the combustion pressure.

Japanese Patent First Publication No. 4-97614 teaches a signal processing circuit for a touch sensor equipped with an piezoelectric element. The signal processing circuit consists of a differentiating circuit, a diode, an integrating circuit, and a comparator. The differentiating circuit receives the electromotive force produced by the piezoelectric element. The diode rectifies an output of the differentiating circuit. The integrating circuit receives an output of the diode. The comparator compares an output of the integrating circuit with a reference voltage. Specifically, the differentiating circuit extracts only a change in electromotive force produced by the piezoelectric element. The integrating circuit stabilizes of the change in electromotive force for increasing the reliability of the output of the sensor.

The above system is designed to determine whether a cumulative value of loads applied to the piezoelectric element is greater than a reference level or not, meaning that the output of the diode only shows an increase in load applied to the piezoelectric element and thus unsuitable for processing a sensor signal indicating the pressure containing a vibrational component such as the combustion pressure of the engine.

SUMMARY OF THE INVENTION

It is therefore a principal object of the invention to avoid the disadvantages of the prior art.

It is another object of the invention to provide a signal processing device capable of processing an output of a piezoelectric element without errors caused by the leakage current and/or electric noises.

According to one aspect of the invention, there is provided a signal processing device which processes an output of a piezoelectric sensor to produce a signal indicative of a load applied to the piezoelectric sensor. The signal processing device comprises: (a) a differentiating circuit differentiating the output of the piezoelectric sensor; and (b) an integrating circuit integrating an output of the differentiating circuit to produce an output signal as a function of the output of the piezoelectric sensor. A frequency range of the output signal is determined based on a frequency range of the load applied to the piezoelectric sensor.

In the preferred mode of the invention, a cut-off frequency of the differentiating circuit is determined based on an upper limit of the frequency range of the load applied to the piezoelectric sensor. A cut-off frequency of the integrating circuit is determined based on a lower limit of the frequency range of the load applied to the piezoelectric sensor.

The piezoelectric sensor includes a piezoelectric element which provides the output changing with a change in physical pressure applied to the piezoelectric element.

The piezoelectric sensor may be installed in a combustion engine to produce the output in response to a change in combustion pressure in a cylinder of the combustion engine. The differentiating circuit extracts from the output of the piezoelectric sensor a component indicative of the change in combustion pressure. The cut-off frequencies of the differentiating circuit and the integrating circuit are determined based on an available range of speed of the combustion engine.

The differentiating circuit may be made up of a capacitor component of the piezoelectric sensor and a resistor.

An operational amplifier may also be provided in which the output of the piezoelectric sensor is inputted to a first input terminal of the operational amplifier, and a positive reference voltage is inputted to a second input terminal of the operational amplifier.

BRIEF DESPCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 1(a) is a longitudinal sectional view which shows a combustion pressure sensor mounted on a glow plug installed in a cylinder head of a diesel engine;

FIG. 1(b) is partially enlarged view of FIG. 1(a);

DESCRIPTION OF THE PREFERRED EMBODIMENTS

Figure 2:
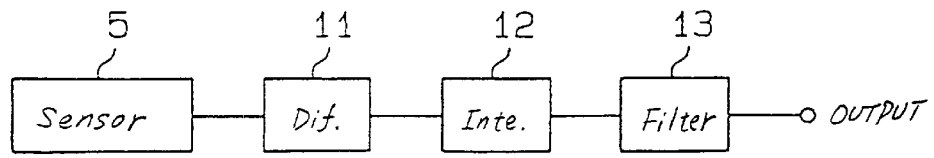
FIG. 2 is a block diagram which shows a circuit structure of a combustion pressure measuring device equipped with the combustion pressure sensor of FIGS. 1(a) and 1(b)

Referring to the drawings, wherein like reference numbers refer to like parts in several views, particularly to FIGS. 1(a) and 1(b), there is shown a combustion pressure sensor 5 according to the invention which may be designed, as discussed below, to be installed in an automotive diesel engine to measure the combustion pressure in a cylinder.

In FIG. 1(a), a glow plug 2 is installed in a cylinder head 1 of the diesel engine with a ceramic heater 3 exposed to a combustion chamber 4. The combustion pressure sensor 5 is fixed on a mount surface for the glow plug 2.

The combustion pressure sensor 5, as clearly shown in FIG. 1(b), includes a pair of ring-shaped piezoelectric elements 6a and 6b, an electrode plate 7 sandwiched between the piezoelectric elements 6a and 6b, a mount base 8, a fixing nut 9, and a signal output line 10. The piezoelectric elements 6a and 6b are each made of a known piezoelectric material such as lead titanate and connected in parallel to each other in order to provide a capacity which is twice that of one of the piezoelectric elements 6a and 6b to amplify an output of the combustion pressure sensor 5. The combustion pressure sensor 5 works to convert a load acting on the piezoelectric elements 6a and 6b arising from displacement or vibration of the glow plug 2 caused by the combustion pressure in the combustion chamber 4 into an electric signal. The combustion pressure sensor 5 may alternatively be made up of three or more piezoelectric elements and installed on a portion of the cylinder head other than the mount surface of the glow plug 2.

FIG. 2 shows a circuit structure of a combustion pressure measuring device equipped with the combustion pressure sensor 5 as described above.

The combustion pressure measuring device includes a differentiating circuit 11, an integrating circuit 12, and a filter 13. The differentiating circuit 11 is connected to an output of the combustion pressure sensor 5. The integrating circuit 12 is connected to an output of the differentiating circuit 11. An output signal of the integrating circuit 12 is transmitted through the filter 13 to an external device such as a microcomputer (not shown) in an engine control system. The filter 13 works to remove unwanted components form an input signal indicative of the combustion pressure in the combustion chamber 4 and adjusts the input signal in a frequency band to a given detection frequency range.

Specifically, when the combustion pressure changes in the combustion chamber 4, it will cause the combustion pressure sensor 5 to produce charges through the piezoelectric elements 6a and 6b of the combustion pressure sensor 5 as a function of the change in pressure in the combustion chamber 4 and output them as a combustion pressure sensor signal to the differentiating circuit 11. The differentiating circuit 11 differentiates the output of the combustion pressure sensor 5 to produce a current signal. The integrating circuit 12 integrates the current signal inputted from the differentiating circuit 11 to produce a voltage signal which changes in level with the change in combustion pressure.

The output of the differentiating circuit 11 may alternatively be picked up directly through a low-pass filter. In this case, an integrating operation on the output of the differentiating circuit 11 may be performed in the external device. Moreover, the filter 13 may alternatively be installed in the external device.

Figure 3:
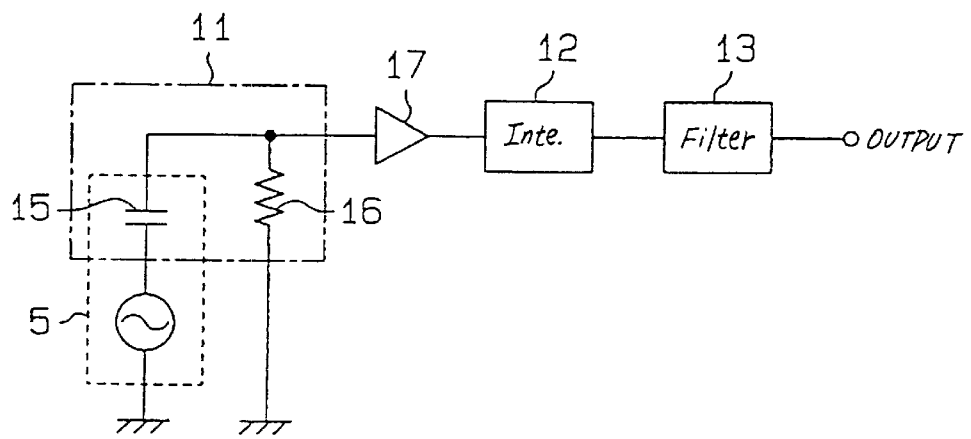
FIG. 3 is a block diagram which shows a circuit structure of an integrating circuit of FIG. 2.

The differentiating circuit 11, as shown in FIG. 3, consists of an equivalent capacitor 15 and a resistor 16. The equivalent capacitor 15 is, in fact, provided in the combustion pressure sensor 5. The output of the differentiating circuit 11 is inputted through an amplifier 17 to the integrating circuit 12.

Figure 4:
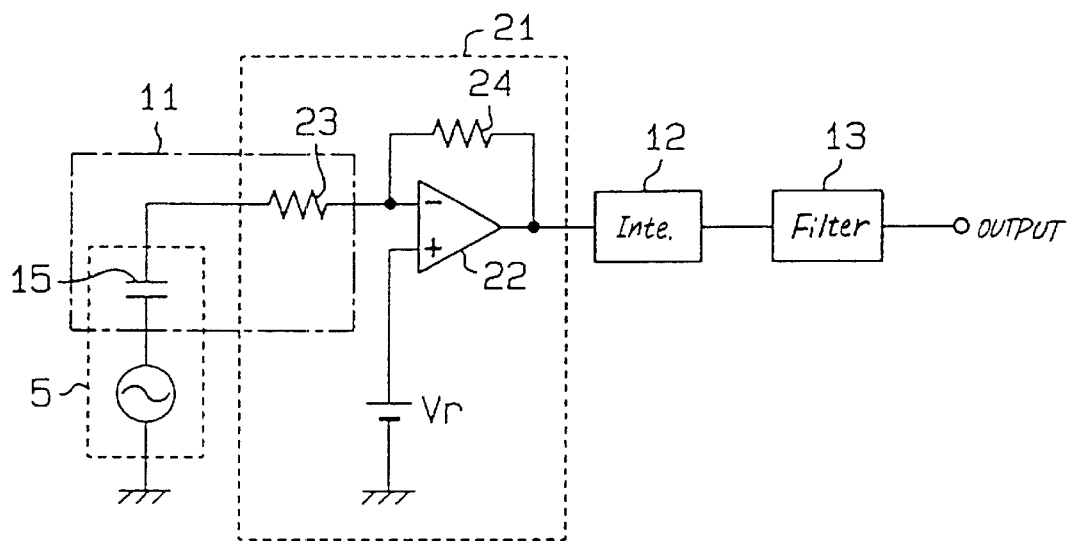
FIG. 4 is a block diagram which shows a modification of the integrating circuit of FIG. 3.

FIG. 4 shows a modification of the combustion pressure measuring device.

A pre-amplifier 21 is disposed between the differentiating circuit 11 and the integrating circuit 12. The pre-amplifier 21 consists of an operational amplifier 22 and resistors 23 and 24. The differentiating circuit 11 is made up of the capacitor 15 built in the combustion pressure sensor 5 and the resistor 23 built in the pre-amplifier 21. A given reference voltage Vr is inputted to a non-inverting input (+) of the operational amplifier 22 to float the electric potential at the non-inverting input on the positive side, thereby elevating the electric potential at the inverting input (−) of the operational amplifier 22 up to that at the non-inverting input thereof so that an output of the operational amplifier 22 oscillates about that potential (i.e., the reference voltage Vr). The reference voltage Vr may be provided by a fraction of a constant voltage (e.g., 5V).

A capacitor may also be connected in parallel to the resistor 24 for the purpose of eliminating noises produced by a drive system for fuel injectors of the diesel engine.

Figure 5:
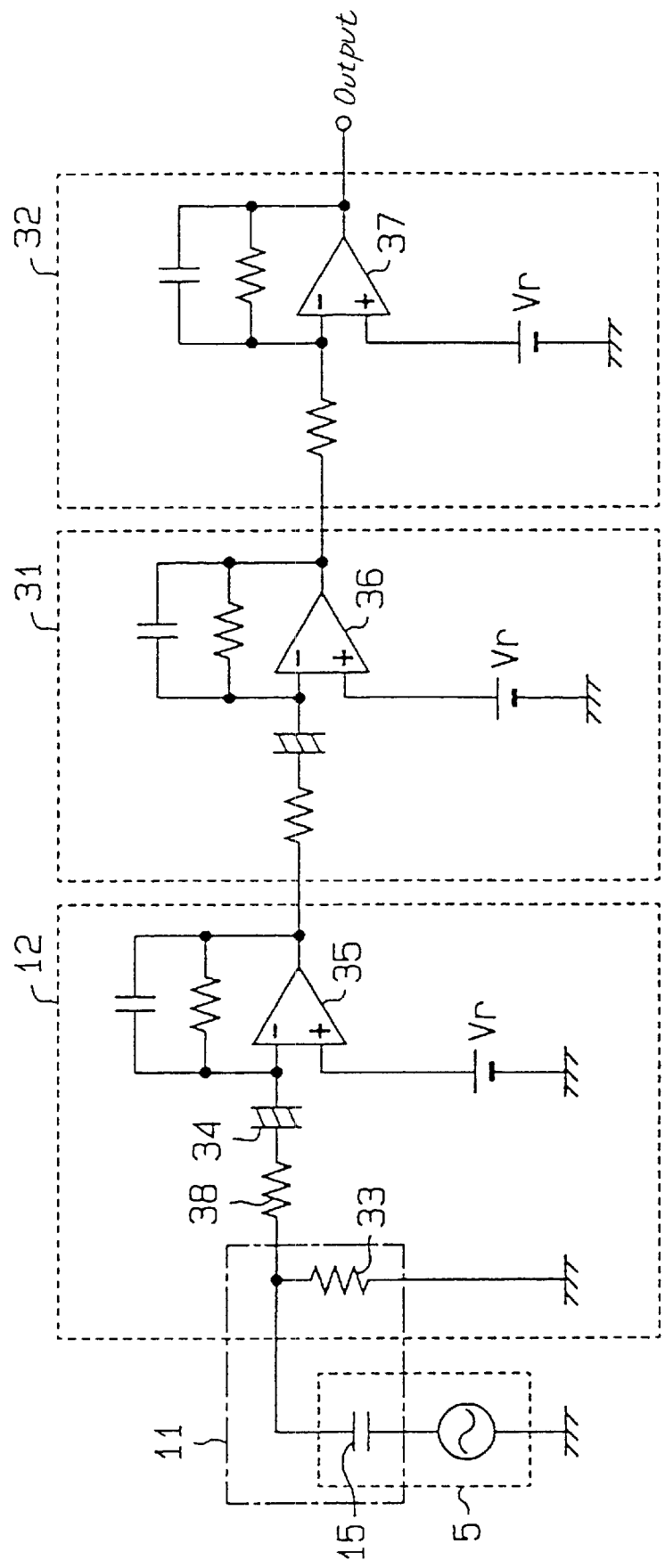
FIG. 5 is a block diagram which shows a modification of the combustion pressure measuring device of FIG. 2.

FIG. 5 shows the second modification of the combustion pressure measuring device.

The differentiating circuit 11 is made up of the capacitor 15 built in the combustion pressure sensor 5 and a resistor 33 connected at one end to ground. A band-pass filter 31 and a low-pass filter 32 are connected to the integrating circuit 12 which work to perform the same function as that of the filter 13. The band-pass filter 31 may alternatively be replaced with a high-pass filter.

Operational amplifiers 35, 36, and 37 of the integrating circuit 12, the band-pass filter 31, and the low-pass filter 32 are each connected at non-inverting inputs (+) thereof to the reference voltage Vr so that the electric potential at the non-inverting inputs is kept on the positive side, thereby elevating the electric potential at the inverting inputs (−) of the operational amplifiers 35, 36, and 37 up to the same potential as that at the non-inverting inputs thereof. This causes each of the operational amplifiers 35, 36, and 37 to provide an output which varies in amplitude about the reference voltage Vr.

The elevation in electric potential at the inverting input (−) of the operational amplifier 35 may cause the direct current to flow from the integrating circuit 12 into the combustion pressure sensor 5, however, the capacitor 34 works to avoid it. The capacitor 34 also works to minimize the adverse effects of the leakage current.

A combination of the capacitor 34 and the resistor 38 [servers] serves as a high-pass filter. The cut-off frequency of the high-pass filter is set to approximately 0.8 Hz. The capacitance of the capacitor 34 is, thus, on the order of several $\mu F$. In this case, an electrolytic capacitor is typically used, thus requiring a low-leakage part. The structure of FIG. 4 is, therefore, preferable to that of FIG. 5.

The determination of a time constant (i.e., a cut-off frequency) of each of the differentiating circuit 11 and the integrating circuit 12 will be described below in detail.

Figure 6A:
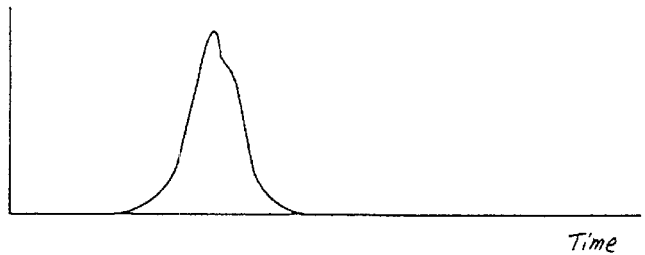
FIG. 6(a) shows a change in combustion pressure.

First, the time constant of the differentiating circuit 11 is determined by pre-monitoring an output of a reference combustion pressure sensor capable of measuring the combustion pressure with high accuracy to derive data on the output and adjusting an output of the differentiating circuit 11 in waveform and phase to the output data derived from the reference combustion pressure sensor. For example, if the combustion pressure changes, as shown in FIG. 6(a), and a value derived by differentiating an output of the reference combustion pressure sensor changes, as indicated by a solid line A in FIG. 6(b), the time constant of the differentiating circuit 11 is so determined that an output of the differentiating circuit 11 agrees in waveform with the differentiated value A.

Figure 6B:
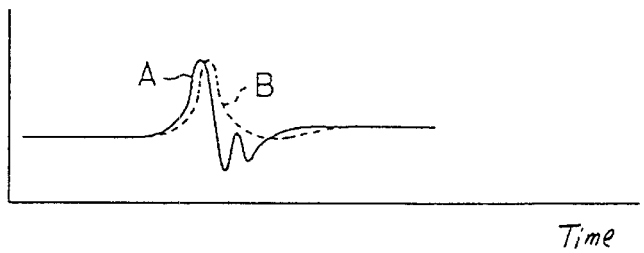
FIG. 6(b) shows a relation between an output of a reference combustion pressure sensor and an output of a differentiating circuit.

In the structure of FIG. 3 wherein the differentiating circuit 11 is made up of the capacitor 15 and the resistor 16, the capacitance of the capacitor 15 is constant. In this case, the time constant of the differentiating circuit 11 is adjusted by changing the resistance value of the resistor 16. The size of waveform of the output of the differentiating circuit 11 is adjusted by the amplifier 17. The waveform, as indicated by a broken line B in FIG. 6(b), is an output of the differentiating circuit 11 in a case where the resistance value of the resistor 16 is on the order of several M $\Omega$. The resistance value is too great, so that the waveform B is shifted from the waveform A. The inventors of this application have found that the agreement of the waveform B with the waveform A is accomplished by decreasing the resistance value of the resistor 16 below 100K $\Omega$.

Figure 7A:
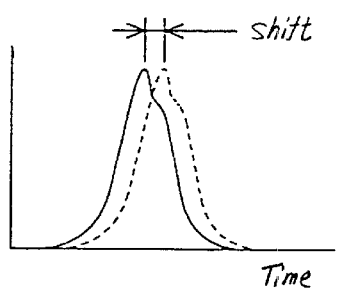
FIG. 7(a) shows a shift of an output of a differentiating circuit after being integrated through an ideal integrating circuit from an output of a reference combustion pressure sensor.
Figure 7C:
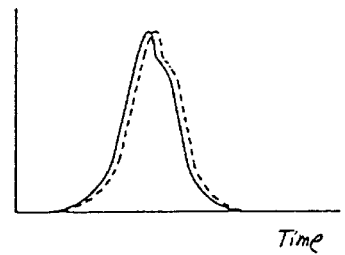
FIG. 7(c) illustrates for the case where there is no shift between an output of the differentiating circuit after being integrated and an output of a reference combustion pressure sensor.
Figure 7B:
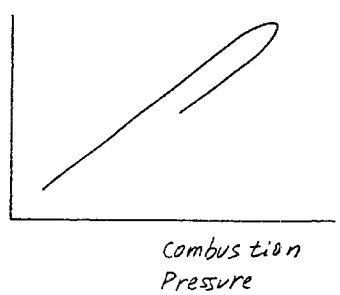
FIG. 7(b) shows the output of the differentiating circuit in FIG. 7(a) which is expressed in the Lissajous waveform.
Figure 7D:
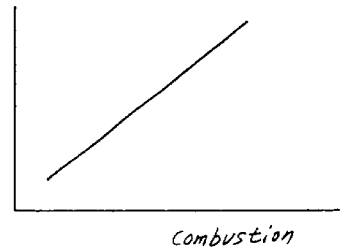
FIG. 7(d) shows the output of the differentiating circuit in FIG. 7(c) which is expressed in the Lissajous waveform.

FIG. 7(a) illustrates a shift of an output of the differentiating circuit 11, as indicated by a broken line, after being integrated through an ideal integrating circuit from an output of the reference combustion pressure sensor, as indicated by a solid line. The waveform, as indicated by the broken line, may alternatively be provided by subjecting an output of the differentiating circuit 11 to a given mathematical integrating operation using a measuring device. The shift in FIG. 7(a) is caused by lags of signals after being differentiated and integrated. The integrated output of the differentiating circuit 11 is expressed, as shown in FIG. 7(b), in the Lissajous waveform. FIG. 7(c) illustrates for the case where there is no shift between the integrated output of the differentiating circuit 11 and the output of the reference combustion pressure sensor. The integrated output of the differentiating circuit 11 is expressed, as shown in FIG. 7(d), in the Lissajous waveform. The time constant of the differentiating circuit 11 is so adjusted as to derive the waveform of FIG. 7(d).

The resistance value of the resistor 16 of the differentiating circuit 11 of this embodiment is set to 25K Ω in the time constant adjustments as discussed above with reference to FIGS. 6(a) to 7(d). In this case, the capacitance of the combustion pressure sensor 5 is 720 pF. The time constant of the differentiating circuit 11 is given by the product of 25K Ω and 720 pF. The cut-off frequency of the differentiating circuit 11 is 8.8 KHz.

The time constant of the integrating circuit 12 is adjusted in the same manner as described above using the output of the reference combustion pressure sensor. For example, in the structure of FIG. 5, the time constant of the integrating circuit 12 is determined by setting the resistance value of the resistor connected in parallel with the operational amplifier 35 to 1M Ω and the capacitance of the capacitor connected in parallel with the operational amplifier 35 to 0.2 $\mu$F. In this case, the cut-off frequency of the integrating circuit 12 is 0.8 Hz.

The frequency characteristic of the above combustion pressure measuring device will be described with reference to FIGS. 8(a), 8(b), and 8(c).

Figure 8A:
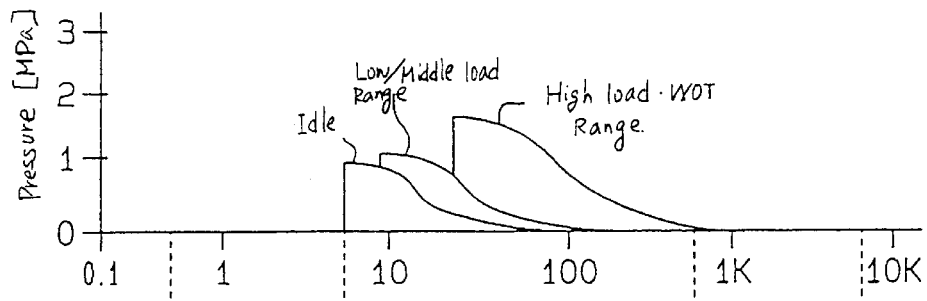
FIG. 8(a) shows a distribution of power spectra of combustion pressure of a diesel engine in idling, low/middle-speed, and high-speed (fully opened throttle) ranges of engine operation.

FIG. 8(a) shows a distribution of power spectra of the combustion pressure of a diesel engine in idling, low/middle-speed, and high-speed (fully opened throttle) ranges of engine operation. FIG. 8(b) shows gains of the differentiating circuit 11 and the integrating circuit 12. FIG. 8(c) shows phases of outputs of the differentiating circuit 11 and the integrating circuit 12.

The power spectra of the combustion pressure are, as can be seen from FIG. 8(a), distributed over a relatively low frequency range of approximately 6.26 Hz to 1 KHz. A measurable frequency range of the combustion pressure measuring device is, thus, set to that range which is substantially identical with an available range of the engine speed since the combustion cycle depends upon the engine speed.

Figure 8B:
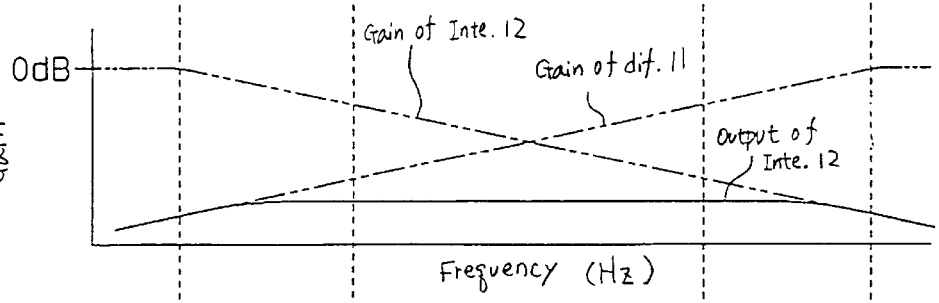
FIG. 8(b) shows gains of a differentiating circuit and an integrating circuit and an output of the integrating circuit.

In FIG. 8(b), the gains of the differentiating circuit 11 and the integrating circuit 12 are indicated by broken lines, respectively, and the gain of an output of the integrating circuit 12 is indicated by a solid line. The cut-off frequency of the differentiating circuit 11 is, as described above, 8.8 KHz that is about eight times an upper limit of the measurable frequency range of the combustion pressure, while the cut-off frequency of the integrating circuit 12 is 0.8 Hz that is about one-eighth (⅛) of a lower limit of the measurable frequency range of the combustion pressure, so that the gain of the output of the integrating circuit 12 is kept constant within the measurable frequency range. The cut-off frequency of the differentiating circuit 11 is preferably about ten times the upper limit of the measurable frequency range, however, it may be less than ten times, as described above, depending upon applications. Similarly, the cut-off frequency of the integrating circuit 12 is preferably about one-tenth (¹⁄₁₀) of the lower limit of the measurable frequency range, however, it may be more than one-tenth, as described above, depending upon applications.

Figure 8C:
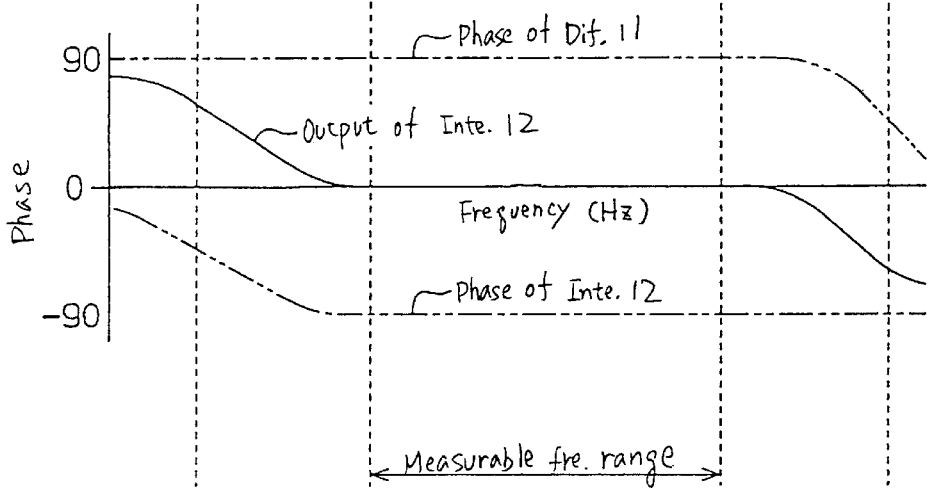
FIG. 8(c) shows phases of outputs of a differentiating circuit and an integrating circuit and an output of the integrating circuit.

In FIG. 8(c), the phases of outputs of the differentiating circuit 11 and the integrating circuit 12 are indicated by broken line, and the output of the integrating circuit 12 is indicated by a solid line. The phase of the output of the integrating circuit is kept constant (0 deg.) by a relation in cut-off frequency between the differentiating circuit 11 and the integrating circuit 12.

As apparent from the above, the combustion pressure measuring device of this embodiment is so designed that the integrating circuit 12 produces an output whose gain is kept constant and phase is not shifted in the measurable frequency range, thereby providing an output of the combustion pressure measuring device which indicates the combustion pressure accurately.

The above described numerical values are merely examples and may be changed depending upon the structure of the combustion pressure sensor 5 and the type of the diesel engine.

Figure 11:
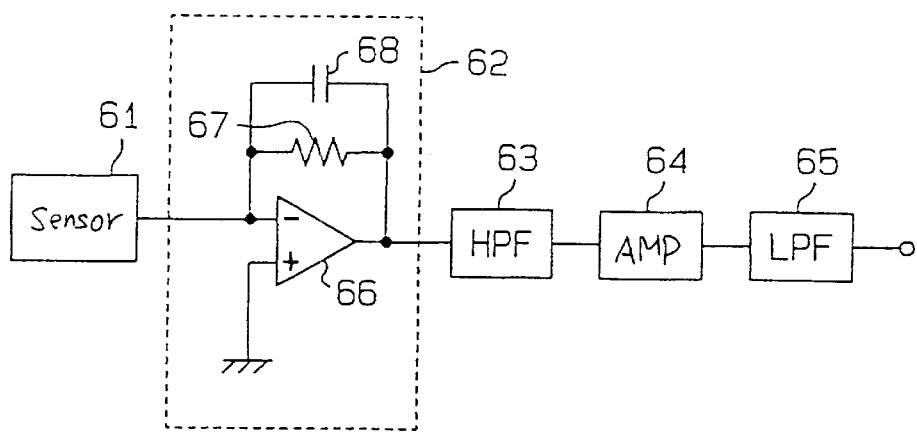
FIG. 11 is a block diagram which shows a circuit structure of a conventional combustion pressure measuring device.
Figure 12A:
FIG. 12(a) shows an example of a change in combustion pressure.
Figure 12B:
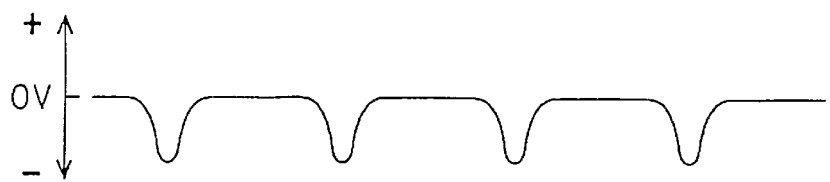
FIG. 12(b) shows an output of an integrating circuit of the conventional combustion pressure measuring device of FIG. 11.
Figure 12C:
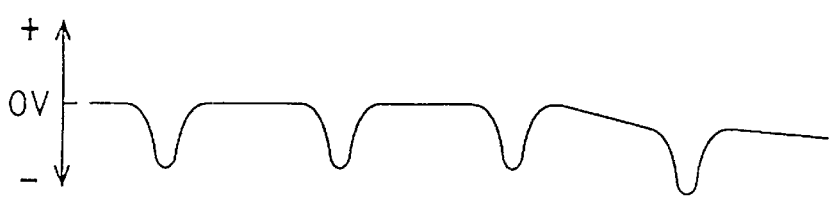
FIG. 12(c) shows an output of an integrating circuit of the conventional combustion pressure measuring device of FIG. 11 in the presence of a leakage current in a combustion pressure.
Figure 12D:
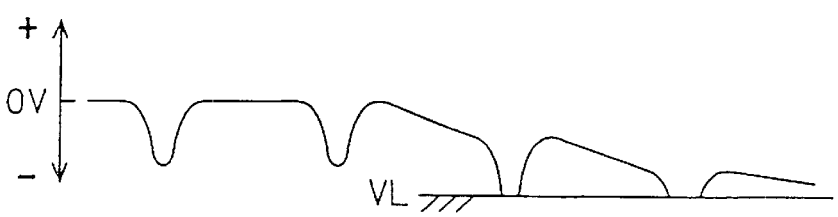
FIG. 12(d) shows an output of an integrating circuit of the conventional combustion pressure measuring device of FIG. 11 in the presence of an undesirable great leakage current in a combustion pressure.

The combustion pressure measuring device of this embodiment, as described above, works to differentiate an output of the combustion pressure sensor 5 to produce a signal as a function of a change in the combustion pressure. Therefore, even if a constant leakage current occurs in the combustion pressure sensor 5 due to a change in ambient temperature, the combustion pressure measuring device works to provide an output indicative of the combustion pressure without being undermined by the effects of the leakage current. The output of the combustion pressure sensor 5 is inputted to the differentiating circuit 11, thus minimizing adverse effects of electric disturbances as compared with the conventional structure, as shown in FIG. 11, in which the output of the combustion pressure sensor 61 is inputted to the charge amplifier 62. The input impedance of the combustion pressure measuring device is, as described above, low (25K Ω in the above embodiment), which also means that the output of the combustion pressure measuring device is not adversely affected by the leakage current contained in the output of the combustion pressure sensor 5.

The output of the differentiating circuit 11 is integrated by the integrating circuit 12 to produce a voltage signal having a waveform following the oscillation of the combustion pressure exerted on the combustion pressure sensor 5. The frequency range of the output of the integrating circuit 12 is, as described above, defined base on the measurable frequency range of the combustion pressure, thereby assuring the accuracy of determining the combustion pressure.

The positive reference voltage Vr is, as described above, inputted to the non-inverting input of each of the operational amplifiers 22, 35 to 37, thereby allowing the combustion pressure to be determined correctly even if the combustion pressure measuring device is actuated on a positive power supply voltage. The combustion pressure measuring device of this invention is, thus, suitable for use in automotive vehicles.

Figure 9:
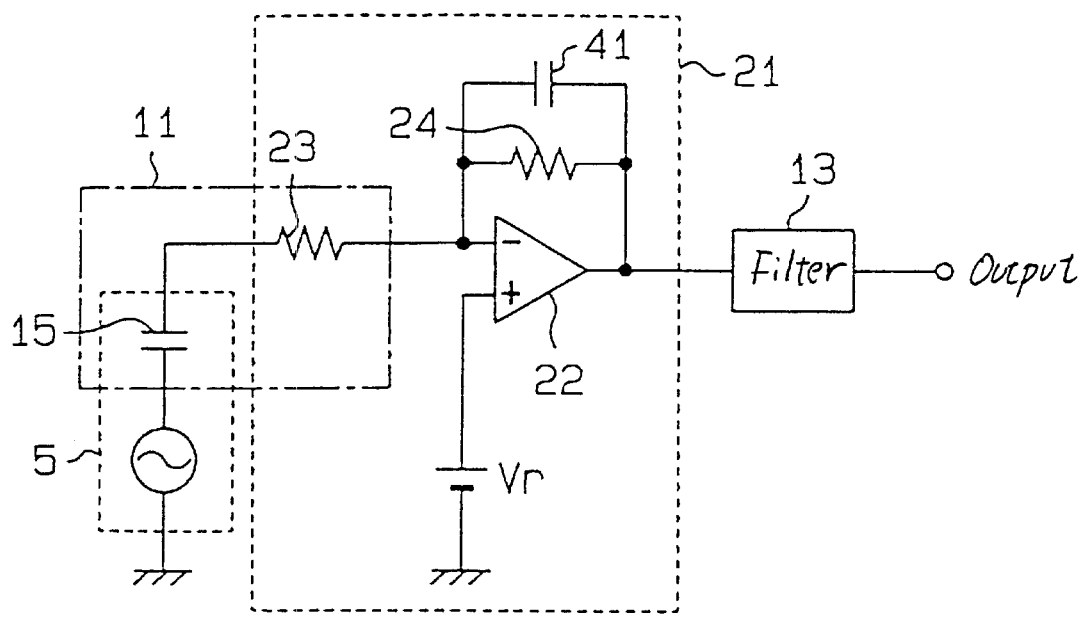
FIG. 9 is a block diagram which shows a circuit structure of a combustion pressure measuring device according to the second embodiment of the invention.

FIG. 9 shows the combustion pressure measuring device according to the second embodiment of the invention.

A capacitor 41 is connected in parallel to the resistor 24 of the pre-amplifier 21 to give an integrating function of the integrating circuit 12 to the pre-amplifier 21. Other arrangements are identical with those in FIG. 4, and explanation thereof in detail will be omitted here.

Figure 10:
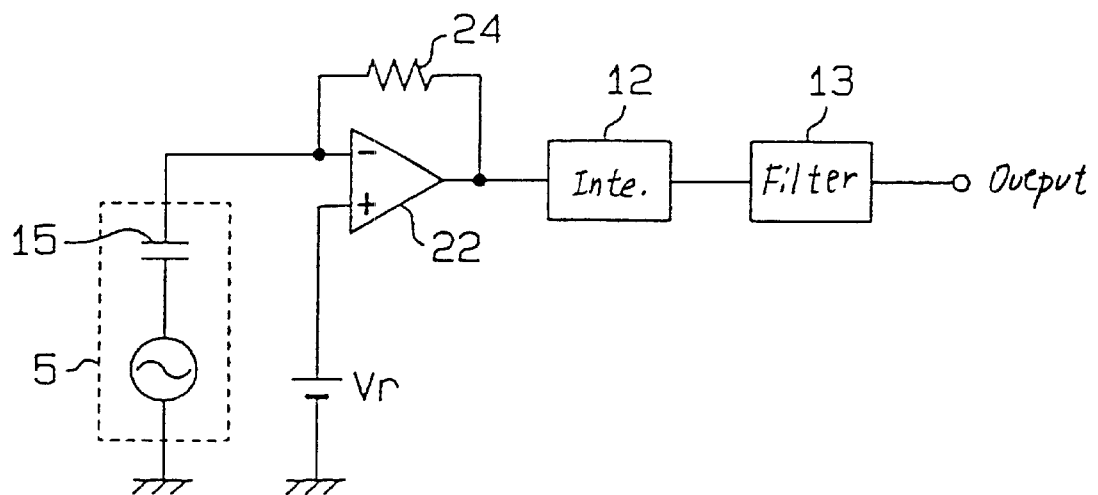
FIG. 10 is a block diagram which shows a circuit structure of a combustion pressure measuring device according to the third embodiment of the invention.

FIG. 10 shows the combustion pressure measuring device according to the third embodiment of the invention.

The resistor 23 is emitted from the structure of FIG. 4 to construct an integrating circuit using the capacitor 15 and the resistor 24. Other arrangements are identical with those in FIG. 4, and explanation thereof in detail will be omitted here.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A signal processing device for processing an output of a piezoelectric sensor to produce a signal indicative of a load applied to the piezoelectric sensor, said device comprising:

a differentiating circuit differentiating the output of the piezoelectric sensor said differentiating circuit having a cut-off frequency greater than an upper limit of a frequency range of the load applied to the piezoelectric sensor; and an integrating circuit integrating an output of said differentiating circuit to produce an output signal as a function of the output of the piezoelectric sensor, said integrating circuit having a cut-off frequency smaller than a lower limit of the frequency range of the load, a frequency range of the output signal being determined based on the frequency range of the load applied to the piezoelectric sensor.

2. A signal processing device as in claim 1, wherein the piezoelectric sensor includes a piezoelectric element which provides an output changing with a change in pressure applied to the piezoelectric element.

3. A signal processing device as in claim 1, wherein:

the piezoelectric sensor is installed in a combustion engine to produce an output in response to a change in combustion pressure in a cylinder of the combustion engine, and the differentiating circuit extracts from the output of the piezoelectric sensor a component indicative of the change in combustion pressure.

4. A signal processing device as in claim 3, wherein the cut-off frequencies of said differentiating circuit and said integrating circuit are determined based on an available range of rotational speed of the combustion engine.

5. A signal processing device as in claim 1, wherein said differentiating circuit includes a capacitance component of the piezoelectric sensor and a resistor.

6. A signal processing device as in claim 1, further comprising:

an operational amplifier in which the output of the piezoelectric sensor is inputted to a first input terminal of said operational amplifier, and a positive reference voltage is inputted to a second input terminal of said operational amplifier.

7. A signal processing device as in claim 1, wherein:

the cut-off frequency of said differentiating circuit is approximately ten times the upper limit of the frequency range of the load, and the cut-off frequency of said integrating circuit is approximately one-tenth of the lower limit of the frequency range of the load.

8. A signal processing device as in claim 1, wherein the frequency range of the output signal covers the frequency range of the load applied to the piezoelectric sensor.

9. A signal processing circuit for processing the output of a piezoelectric sensor to produce a signal indicative of a load applied to the piezoelectric sensor, said circuit comprising:

a differentiating circuit connected to differentiate piezoelectric sensor output to produce a once-differentiated piezoelectric sensor output; and an integrating circuit connected to integrate said once-differentiated piezoelectric sensor output to produce said output signal indicative of a load applied to the piezoelectric sensor.

10. A method for measuring a variable frequency cyclic mechanical load associated with an internal combustion engine, said method comprising:

applying to a piezoelectric sensor a mechanical load related to said cyclic mechanical load to generate a first electrical signal;

differentiating said first electrical signal with respect to time to produce a second electrical signal; and integrating said second electrical signal with respect to time to produce a third electrical signal representative of said cyclic mechanical load.

11. A method as in claim 10 wherein:

said differentiating is performed using a differentiating circuit having a cut-off frequency substantially above the highest frequency of said cyclic load; and said integrating is performed using an integrating circuit having a cut-off frequency substantially below the lowest frequency of said cyclic load.

\* \* \* \* \*